United States Patent
Jump et al.

(10) Patent No.: US 7,641,928 B2
(45) Date of Patent: Jan. 5, 2010

(54) DEWATERING WHOLE STILLAGE

(75) Inventors: Joseph Jump, Raleigh, NC (US); Gregory DeLozier, Copenhagen (DK); Jiyin Liu, Raleigh, NC (US)

(73) Assignee: Novozymes North America, Inc., Franklinton, NC (US)

( * ) Notice: Subject to any disclaimer, the term of this patent is extended or adjusted under 35 U.S.C. 154(b) by 0 days.

(21) Appl. No.: 12/088,877

(22) PCT Filed: Nov. 3, 2006

(86) PCT No.: PCT/US2006/043246

§ 371 (c)(1),
(2), (4) Date: Apr. 1, 2008

(87) PCT Pub. No.: WO2007/056321

PCT Pub. Date: May 18, 2007

(65) Prior Publication Data

US 2008/0257821 A1    Oct. 23, 2008

Related U.S. Application Data

(60) Provisional application No. 60/734,449, filed on Nov. 8, 2005.

(51) Int. Cl.
*A23P 1/02* (2006.01)
*C02F 1/54* (2006.01)

(52) U.S. Cl. .................. 426/479; 426/478; 426/489; 426/495; 426/805; 426/807; 210/632

(58) Field of Classification Search ............... 426/615, 426/422, 424, 443, 453, 478, 479, 495, 489, 426/805, 807; 210/632
See application file for complete search history.

(56) References Cited

U.S. PATENT DOCUMENTS

| | | |
|---|---|---|
| 3,928,631 A | 12/1975 | Freeman et al. |
| 5,662,810 A | 9/1997 | Willgohs |
| 6,431,370 B1 | 8/2002 | Braunstein et al. |
| 6,733,673 B2 | 5/2004 | Sarkar et al. |
| 2004/0115779 A1 | 6/2004 | Olsen et al. |
| 2004/0234649 A1 | 11/2004 | Lewis et al. |
| 2005/0079270 A1 | 4/2005 | Scheimann |

*Primary Examiner*—C. Sayala
(74) *Attorney, Agent, or Firm*—Jennifer L. Fox (57) ABSTRACT

The present invention relates to a method of dewatering whole stillage comprising subjecting whole stillage to one or more enzymes capable of degrading a whole stillage component and separating the material obtained in step i) into a solid fraction and a liquid fraction.

16 Claims, 1 Drawing Sheet

Figure 1

DEWATERING WHOLE STILLAGE

CROSS-REFERENCE TO RELATED APPLICATIONS

This application is a 35 U.S.C. 371 national application of PCT/US2006/043246 filed Nov. 3, 2006 which claims priority or the benefit under 35 U.S.C. 119 of U.S. provisional application No. 60/734,449 filed Nov. 8, 2005, the contents of which are fully incorporated herein by reference.

FIELD OF THE INVENTION

The present invention relates to a process of enzymatic dewatering whole stillage derived from a fermentation product production process.

BACKGROUND OF THE INVENTION

Fermentation products, such as ethanol, are produced by first degrading starch-containing material into fermentable sugars by liquefaction and saccharification and then converting the sugars directly or indirectly into the desired fermentation product using a fermenting organism. Liquid fermentation products are recovered from the fermented mash (often referred to as "beer mash"), e.g., by distillation, which separate the desired fermentation product from other liquids and/or solids. The remaining faction, referred to as "whole stillage", is dewatered and separated into a solid and a liquid phase, e.g., by centrifugation. The solid phase is referred to as "wet cake" (or "wet grains") and the liquid phase (supernatant) is referred to as "thin stillage". Dewatered wet cake is dried to provide "Distillers Dried Grains" (DDG) used as nutrient in animal feed. Thin stillage is typically evaporated to provide condensate and syrup or may alternatively be recycled directly to the slurry tank as "backset". Condensate may either be forwarded to a methanator before being discharged or may be recycled to the slurry tank. The syrup consisting mainly of limit dextrins and non-fermentable sugars may be blended into DDG or added to the wet cake before drying to produce DDGS (Distillers Dried Grain with Solubles).

US patent application no. 2005/0079270 A1 discloses a method of dewatering corn stillage solids comprising adding to the solids an anionic copolymer comprising acrylic acid sodium salt, methacrylic acid sodium salt or 2-acrylamido-2-methyl-1-propanesulfonic acid sodium salt to form a mixture of water and coagulated and flocculated solids; and separating the water from the coagulated and flocculated solids using a dewatering device.

Dewatering of whole stillage is energy demanding and may consume up to one-third of the energy requirement of a plant producing ethanol or a similar fermentation product. Thus, there is a need for improving processes involved in dewatering of whole stillage.

DESCRIPTION OF THE INVENTION

Figure 1:
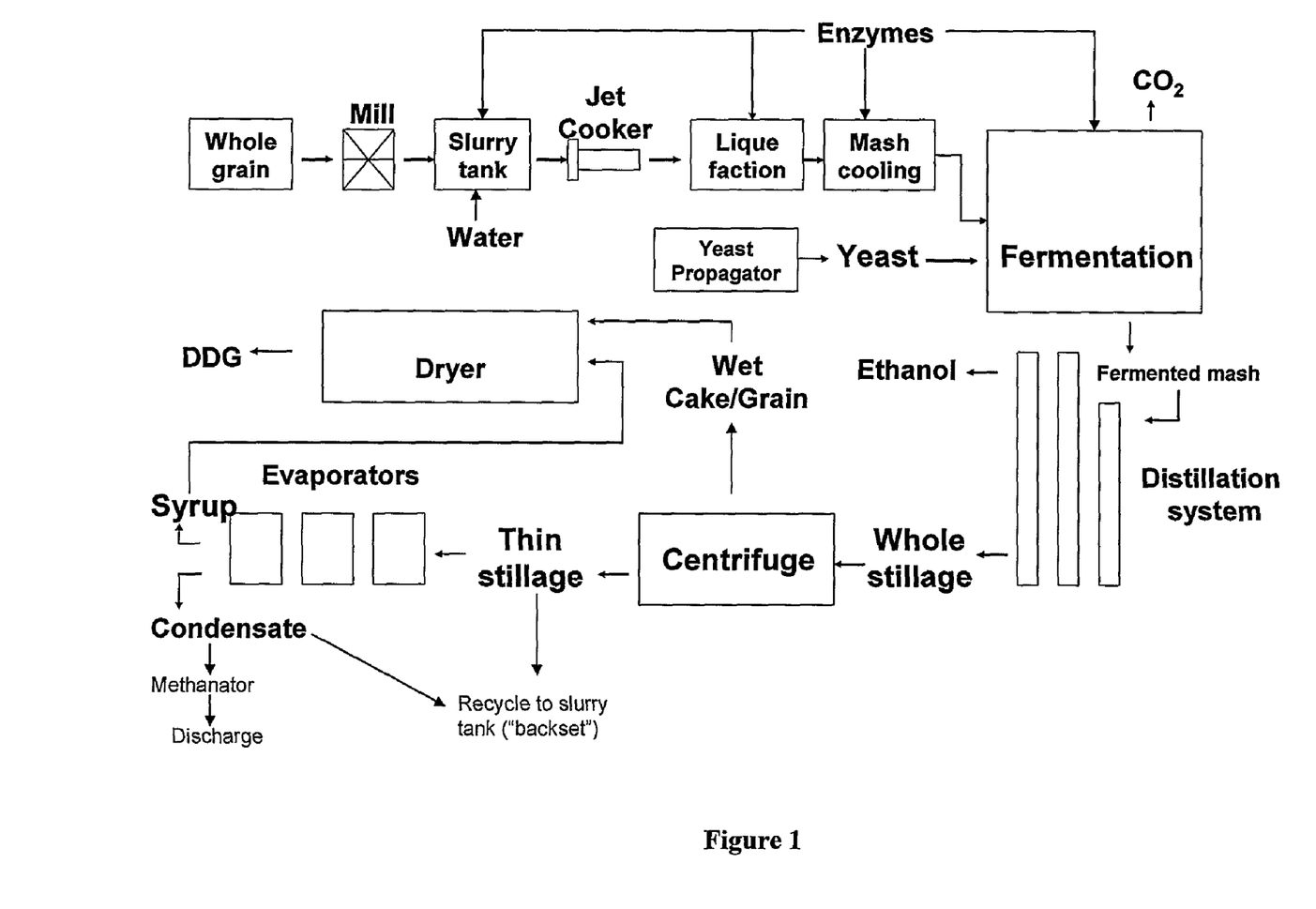
FIG. 1 schematically shows an ethanol production process.

The object of the present invention is to provide a method of dewatering whole stillage.

The present inventors have surprisingly found that subjecting whole stillage to enzymes capable of degrading whole stillage components improves the solid-liquid separation and thereby increases the solid content in the wet cake after centrifugation compared to a corresponding method carried out without the presence of enzyme. Enzymes used for degrading whole stillage components include carbohydrases such as alpha-amylase, glucoamylase, cellulase and/or hemicellulase, such as xylanase and beta-glucanase, pectinase, and protease, or a mixture thereof. Example 1 shows that subjecting whole stillage to one or more enzymes capable of degrading whole stillage components increases the percentage of solids in wet cake after centrifugation. This is advantageous as the energy cost of drying the wet cake is reduced when producing DDG or DDGS. The cost of transporting the wet cake from one place to another is also reduced. Further, the need for maintenance and repair of centrifuges, dryers and other equipment used is also reduced. All in all, the production cost is reduced. Examples 2 and 3 also disclose enzymatic dewatering with enzymes capable of degrading at least one whole stillage component.

Therefore, the first aspect the invention relates to a method of dewatering whole stillage comprising the steps of:
i) subjecting whole stillage to one or more enzymes capable of degrading one or more whole stillage components,
ii) separating the material into a solid fraction and a liquid fraction.

The solid fraction is often referred to as "wet cake" and the liquid fraction is often referred to as "thin stillage". Step i) and ii) may be carried out simultaneously or sequentially.

Whole Stillage and Production of Fermentation Products

The method of the invention may be used on whole stillage derived from production of any suitable fermentation product. The feedstock for producing the fermentation product may be any starch-containing material, preferably starch-containing plant material, including: tubers, roots, whole grain; and any combination thereof. The starch-containing material may be obtained from cereals. Suitable starch-containing material includes corn (maize), wheat, barley, cassava, sorghum, rye, potato, or any combination thereof. Corn is the preferred feedstock, especially when the fermentation product is ethanol. The starch-containing material may also consist of or comprise, e.g., a side stream from starch processing, e.g., $C_6$ carbohydrate containing process streams that may not be suited for production of syrups. Whole stillage typically contains about 10-15 wt-% dry solids. Whole stillage components include fiber, hull, germ, oil and protein components from the starch-containing feedstock as well as non-fermented starch.

Production of a fermentation product is typically divided into the following main process stages:

a) Reducing the particle size of starch-containing material, e.g., by dry or wet milling;

b) Cooking the starch-containing material in aqueous slurry to gelatinize the starch, c) Liquefying the gelatinized starch-containing material in order to break down the starch (by hydrolysis) into maltodextrins (dextrins);

d) Saccharifying the maltodextrins (dextrins) to produce low molecular sugars (e.g., $DP_{1-2}$) that can be metabolized by a fermenting organism;

e) Fermenting the saccharified material using a suitable fermenting organism directly or indirectly converting low molecular sugars into the desired fermentation product;

f) Recovering the fermentation product, e.g., by distillation in order to separate the fermentation product from the fermentation mash.

As also explained in the "Background"-section above whole stillage is a by-product consisting of liquids and solids remaining after recovery (e.g. by distillation) of a desired fermentation product from fermented mash (beer mash). According to the invention the fermentation product may be any fermentation product, including alcohols (e.g., ethanol, methanol, butanol, 1,3-propanediol); organic acids (e.g., citric acid, acetic acid, itaconic acid, lactic acid, gluconic acid, gluconate, succinic acid, 2,5-diketo-D-gluconic acid); ketones (e.g., acetone); amino acids (e.g., glutamic acid); gases (e.g., $H_2$ and $CO_2$), and more complex compounds, including, for example, antibiotics (e.g., penicillin and tetracycline); enzymes; vitamins (e.g., riboflavin, $B_{12}$, beta-carotene); and hormones. Fermentation is also commonly used in the consumable alcohol (e.g., beer and wine), dairy (e.g., in the production of yogurt and cheese), leather, and tobacco industries. In a preferred embodiment the fermentation product is a liquid, preferably an alcohol, especially ethanol.

The whole stillage contemplated according to the invention may be the side-product resulting from a fermentation product production process including above mentioned steps a) to f). However, the whole stillage may also be the side-product resulting from other fermentation product production processes based on starch-containing starting material.

Dewatering of Whole Stillage

Dewatering of whole stillage, in order to remove a significant portion of the liquid/water, may according to the invention (step ii) be done using any suitable separation technique, including centrifugation, pressing and filtration. In an embodiment the whole stillage is heated to a temperature of about 20-60° C. or around the optimum of the enzyme(s) in question. The pH is the range from 3-7, preferably pH 3-6. In general the enzymatic treatment of whole stillage is carried out under condition suitable for the enzyme(s) in question.

In a preferred embodiment the dewatering is carried out by centrifugation. Preferred centrifuges in industry today are decanter type centrifuges, preferably high speed decanter type centrifuges. An example of a suitable centrifuge is the NX 400 steep cone series from Alfa Laval which is a high-performance decanter.

In another preferred embodiment the separation is carried out using other conventional separation equipment such as a plate/frame filter presses, belt filter presses, screw presses, gravity thickeners and deckers, or similar equipment.

Drying of Wet Cake

After the wet cake, containing about 30-35 wt-% dry solids, has been dewatered it may be dried in a drum dryer, spray dryer, ring drier, fluid bed drier or the like in order to produce "Distillers Dried Grains" (DDG). DDG is a valuable feed ingredient for livestock, poultry and fish. It is preferred to provide DDG with a content of less than about 10-12 wt.-% moisture to avoid mold and microbial breakdown and increase the shelf life. Further, high moisture content also makes it more expensive to transport DDG. The wet cake is preferably dried under conditions that do not denature proteins in the wet cake. The wet cake may be blended with syrup separated from the thin stillage fraction and dried into DDG with Solubles (DDGS).

Enzyme Activities Used for Treating Whole Stillage

One or more of the following enzyme activities may be used according to the invention to treat whole stillage in order to increase the solid content in wet cake. In a preferred embodiment the enzyme(s) include one or more carbohydrases.

Alpha-Amylases

The method of the invention, including step i), may be carried out using any suitable alpha-amylase. In a preferably embodiment a bacterial alpha-amylase and/or a fungal alpha-amylase may be used. Alpha-amylase may be added in an effective amount, preferably in the range from 0.001-1 mg enzyme protein per g DS (in whole stillage), preferably 0.01-0.5 mg enzyme protein per g DS.

Bacterial Alpha-Amylases

Examples of suitable alpha-amylases include the below mentioned. Preferred bacterial alpha-amylases used in step i) may be derived from a strain the genus *Bacillus* (sometimes referred to as *Geobacillus*), including a strain of *Bacillus licheniformis*, *Bacillus amyloliquefaciens*, *Bacillus stearothermophilus*, or *Bacillus subtilis*. Other bacterial alpha-amylases include alpha-amylase derived from a strain of the *Bacillus* sp. NCIB 12289, NCIB 12512, NCIB 12513 or DSM 9375, all of which are described in detail in WO 95/26397, and the alpha-amylase described by Tsukamoto et al., Biochemical and Biophysical Research Communications, 151 (1988), pp. 25-31 (hereby incorporated by reference).

The *Bacillus* alpha-amylase may also be a variant and/or hybrid, especially one described in any of WO 96/23873, WO 96/23874, WO 97/41213, WO 99/19467, WO 00/60059, and WO 02/10355 (all documents hereby incorporated by reference). Specifically contemplated alpha-amylase variants are disclosed in U.S. Pat. Nos. 6,093,562, 6,297,038 or U.S. Pat. No. 6,187,576 (hereby incorporated by reference) and include *Bacillus stearothermophilus* alpha-amylase (BSG alpha-amylase) variants having a deletion of one or two amino acid in positions R179 to G182, preferably a double deletion disclosed in WO 1996/023873—see e.g., page 20, lines 1-10 (hereby incorporated by reference), preferably corresponding to delta(181-182) compared to the wild-type BSG alpha-amylase amino acid sequence set forth in SEQ ID NO:3 disclosed in WO 99/19467 or deletion of amino acids R179 and G180 using SEQ ID NO:3 in WO 99/19467 for numbering (which reference is hereby incorporated by reference). Even more preferred are *Bacillus* alpha-amylases, especially *Bacillus stearothermophilus* alpha-amylase, which have a double deletion corresponding to delta(181-182) and further comprise a N193F substitution (also denoted 1181*+G182*+N193F) compared to the wild-type BSG alpha-amylase amino acid sequence set forth in SEQ ID NO:3 disclosed in WO 99/19467.

A hybrid alpha-amylase specifically contemplated comprises 445 C-terminal amino acid residues of the *Bacillus licheniformis* alpha-amylase (shown in SEQ ID NO: 4 of WO 99/19467) and the 37 N-terminal amino acid residues of the alpha-amylase derived from *Bacillus amyloliquefaciens* (shown in SEQ ID NO: 5 of WO 99/19467), with the following substitution: G48A+T491+G107A+H156Y+A181T+N190F+I201F+A209V+Q264S (using the numbering in SEQ ID NO: 4 in WO 99/19467). Especially preferred are variants having one or more of the mutations H154Y, A181T, N190F, A209V and Q264S and/or deletion of two residues between positions 176 and 179, preferably deletion of E178 and G179 (using the SEQ ID NO: 5 numbering of WO 99/19467).

Commercially available bacterial alpha-amylase products and products containing alpha-amylases include TERMAMYL™ SC, LIQUOZYME™ SC, BAN (Novozymes A/S, Denmark) DEX-LOT™, SPEZYME™ ETHYL, SPEZYME™ XTRA, SPEZYME™ M, SPEZYME FRED-L, SPEZYME™ ALPHA, SPEZYME HPA and SPEZYME™ DELTA AA (from Genencor Int., USA), ULTRA-THIN (Valley Research, IN, USA. Alpha-amylase may be added in an amount effective in the range from $0.0001 \times 10^6$-$1 \times 10^6$ KNU per dry ton substrate (whole stillage).

Fungal Alpha-Amylases

Fungal alpha-amylases (EC 3.2.1.1) are preferably of filamentous fungus origin. The fungal alpha-amylase may be a fungal acid alpha-amylase.

Fungal acid alpha-amylases include acid alpha-amylases derived from a strain of the genus *Aspergillus*, such as *Aspergillus oryzae* and *Aspergillus niger* alpha-amylases.

A preferred fungal alpha-amylase is a Fungamyl-like alpha-amylase which is preferably derived from a strain of *Aspergillus oryzae*. In the present disclosure, the term "Fungamyl-like alpha-amylase" indicates an alpha-amylase which exhibits a high identity, i.e. more than 70%, more than 75%, more than 80%, more than 85% more than 90%, more than 95%, more than 96%, more than 97%, more than 98%, more than 99% or even 100% identity to the mature part of the amino acid sequence shown in SEQ ID NO: 10 in WO 96/23874.

Another preferred acid alpha-amylase is derived from a strain *Aspergillus niger*. In a preferred embodiment the acid fungal alpha-amylase is the one from *A. niger* disclosed as "AMYA_ASPNG" in the Swiss-prot/TeEMBL database under the primary accession no. P56271 and described in more detail in WO 89/01969 (Example 3). The acid *Aspergillus niger* acid alpha-amylase is also shown as SEQ ID NO: 1 in WO 2004/080923 (Novozymes) which is hereby incorporated by reference. Also variants of said acid fungal amylase having at least 70% identity, such as at least 80% or even at least 90% identity, such as at least 95%, at least 96%, at least 97%, at least 98%, or at least 99% identity to SEQ ID NO: 1 in WO 2004/080923 are contemplated. A suitable commercially available acid fungal alpha-amylase derived from *Aspergillus niger* is SP288 (available from Novozymes A/S, Denmark).

The fungal acid alpha-amylase may also be a wild-type enzyme comprising a carbohydrate-binding module (CBM) and an alpha-amylase catalytic domain (i.e., a none-hybrid), or a variant thereof. In an embodiment the wild-type acid fungal alpha-amylase is derived from a strain of *Aspergillus kawachii*.

Commercial available compositions comprising fungal alpha-amylase include FUNGAMYL™ and the acid fungal alpha-amylase sold under the trade name SP288 (available from Novozymes A/S, Denmark).

In an embodiment the fungal acid alpha-amylase is a hybrid alpha-amylase. Preferred examples of fungal hybrid alpha-amylases include the ones disclosed in WO 2005/003311 or U.S. Patent Publication no. 2005/0054071 (Novozymes) or U.S. patent application No. 60/638,614 (Novozymes) which is hereby incorporated by reference. A hybrid alpha-amylase may comprise an alpha-amylase catalytic domain (CD) and a carbohydrate-binding domain/module (CBM), such as a starch binding domain, and optional a linker.

Specific examples of contemplated hybrid alpha-amylases include those disclosed in Table 1 to 5 of the examples in co-pending U.S. patent application No. 60/638,614, including Fungamyl variant with catalytic domain JA118 and *Athelia rolfsii* SBD (SEQ ID NO: 2 herein and SEQ ID NO:100 in U.S. 60/638,614), *Rhizomucor pusillus* alpha-amylase with *Athelia rolfsii* AMG linker and SBD (SEQ ID NO: 3 herein and SEQ ID NO:101 in U.S. 60/638,614), *Rhizomucor pusillus* alpha-amylase with *Aspergillus niger* glucoamylase linker and SBD (which is disclosed in Table 5 as a combination of amino acid sequences SEQ ID NO:20 SEQ ID NO:72 and SEQ ID NO:96 in U.S. application Ser. No. 11/316,535 and further as SEQ ID NO: 13 herein), and *Meripilus giganteus* alpha-amylase with *Athelia rolfsii* glucoamylase linker and SBD (SEQ ID NO: 4 herein and SEQ ID NO:102 in U.S. 60/638,614). Other specifically contemplated hybrid alpha-amylases are any of the ones listed in Tables 3, 4, 5, and 6 in Example 4 in U.S. application Ser. No. 11/316,535 or (WO 2006/069290) (hereby incorporated by reference). Other specific examples of contemplated hybrid alpha-amylases include those disclosed in U.S. Patent Publication no. 2005/0054071, including those disclosed in Table 3 on page 15, such as *Aspergillus niger* alpha-amylase with *Aspergillus kawachii* linker and starch binding domain.

Fungal alpha-amylases may be added in an effective amount, preferably in the range from 0.001-1 mg enzyme protein per g DS (in whole stillage), preferably 0.01-0.5 mg enzyme protein per g DS.

Glucoamylase

The method of the invention, including step i), may be carried out using any suitable glucoamylase. In a preferably embodiment the glucoamylase is of bacterial or fungal origin.

Glucoamylase may be added in an effective amount, preferably in the range from 0.001-1 mg enzyme protein per g DS, preferably 0.01-0.5 mg enzyme protein per g dry substrate.

Contemplated glucoamylases include those from the group consisting of *Aspergillus* glucoamylases, in particular *A. niger* G1 or G2 glucoamylase (Boel et al. (1984), EMBO J. 3 (5), p. 1097-1102), or variants thereof, such as those disclosed in WO 92/00381, WO 00/04136 and WO 01/04273 (from Novozymes, Denmark); the *A. awamori* glucoamylase disclosed in WO 84/02921, *A. oryzae* glucoamylase (Agric. Biol. Chem. (1991), 55 (4), p. 941-949), or variants or fragments thereof. Other *Aspergillus* glucoamylase variants include variants with enhanced thermal stability: G137A and G139A (Chen et al. (1996), Prot. Eng. 9, 499-505); D257E and D293E/Q (Chen et al. (1995), Prot. Eng. 8, 575-582); N182 (Chen et al. (1994), Biochem. J. 301, 275-281); disulphide bonds, A246C (Fierobe et al. (1996), Biochemistry, 35, 8698-8704; and introduction of Pro residues in position A435 and S436 (Li et al. (1997), Protein Eng. 10, 1199-1204.

Other glucoamylases contemplated include glucoamylase derived from a strain of *Athelia*, preferably a strain of *Athelia rolfsii* (previously denoted *Corticium rolfsii*) glucoamylase (see U.S. Pat. No. 4,727,026 and (Nagasaka, Y. et al. (1998) "Purification and properties of the raw-starch-degrading glucoamylases from *Corticium rolfsii*, Appl Microbiol Biotechnol 50:323-330), *Talaromyces* glucoamylases, in particular derived from *Talaromyces emersonii* (WO 99/28448), *Talaromyces leycettanus* (U.S. Pat. No. Re. 32,153), *Talaromyces duponti*, *Talaromyces thermophilus* (U.S. Pat. No. 4,587,215). Also contemplated are the *Trichoderma reesei* glucoamylases disclosed as SEQ ID NO: 4 in WO 2006/060062 and glucoamylases being at least 80% or at least 90% identical thereto and further the glucoamylase derived from *Humicola grisea* disclosed as SEQ ID NO: 3 in U.S. Ser. No. 10/992,187 (hereby incorporated by reference) or sequences having at least 80% or at least 90% identity thereto.

Other contemplated glucoamylases include glucoamylase derived from a strain of Trametes, preferably a strain of *Trametes cingulata* disclosed in WO 2006/069289 (which is hereby incorporated by reference). Also hybrid glucoamylase are contemplated according to the invention. Examples the hybrid glucoamylases disclosed in WO 2005/045018. Specific examples include the hybrid glucoamylase disclosed in Table 1 and 4 of Example 1 (which hybrids are hereby incorporated by reference.).

Bacterial glucoamylases contemplated include glucoamylases from the genus *Clostridium*, in particular *C. thermoamylolyticum* (EP 135,138), and *C. thermohydrosulfuricum* (WO 86/01831).

Commercially available compositions comprising glucoamylase include AMG 200L; AMG 300 L; SAN™ SUPER, SAN™ EXTRA L, SPIRIZYME™ PLUS, SPIRIZYME™ FUEL, SPIRIZYME™ B4U and AMG™ E (from Novozymes A/S); OPTIDEX™ 300 (from Genencor Int.); AMIGASE™ and AMIGASE™ PLUS (from DSM); G-ZYME™ G900, G-ZYME™ and G990 ZR (from Genencor Int.).

Glucoamylases may in an embodiment be added in an amount of 0.02-20 AGU/g DS, preferably 0.05-5 AGU/g DS (in whole stillage), especially between 0.1-2 AGU/g DS.

Cellulases and Hemicellulases

Cellulase

A cellulase, used in accordance with the invention, may be any cellulase, in particular of microbial origin, in particular fungal or bacterial origin such as a cellulase derivable from a strain of a filamentous fungus (e.g., *Aspergillus, Trichoderma, Humicola, Fusarium*). Preferably, the cellulase acts on both cellulosic and lignocellulosic material. Preferred cellulases for use in the present invention include exo-acting celluases and cellobiases, and combinations thereof. More preferably, the treatment involves the combination of an exo-acting cellulase and a cellobiase. Preferably, the cellulases have the ability to hydrolyze cellulose or lignocellulose under acidic conditions of below pH 7.

Examples of commercially available cellulases suitable according to the present invention include, for example, CELLULCLAST™ (available from Novozymes A/S), NOVOZYM™ 188 (available from Novozymes A/S). Other commercially available preparations comprising cellulase include CELLUZYME™, CEREFLO™ and ULTRAFLO™ (Novozymes A/S), LAMINEX™ and SPEZYME™ CP (Genencor Int.) and ROHAMENT™ 7069 W (from Röhm GmbH). Cellulase may be added in amounts effective in the range from $0.1 \times 10^6$-$10 \times 10^6$ ECU per dry ton substrate (in whole stillage) or from $0.1 \times 10^6$-$10 \times 10^6$ EGU per dry ton substrate (in whole stillage).

Hemicellulase

Any hemicellulase capable of degrading a whole stillage component may in accordance with the invention be used in step i). Preferred hemi-cellulases for use in the present invention include xylanases, arabinofuranosidases, acetyl xylan esterase, glucuronidases, endo-galactanase, mannases, endo or exo arabinases, exo-galactanses, and mixtures thereof. Preferably, the hemicellulase for use in the present invention is an exo-acting hemicellulase, and more preferably, the hemicellulase is an exo-acting hemicellulase which has the ability to hydrolyze hemicellulose under acidic conditions of below pH 7. An example of hemicellulase suitable for use in the present invention includes VISCOZYME L™ (available from Novozymes A/S, Denmark). Hemicellulase may be added in an amount effective in the range from $0.001 \times 10^6$-$10 \times 10^6$ FBG per dry ton substrate (in whole stillage).

Xylanase

According to the invention whole stillage may in step i) be subjected to an effective amount of any xylanase (EC 3.2.1.8), such as any of below mentioned xylanases. Xylanase activity may be derived from any suitable organism, including fungal and bacterial organisms. Fungal xylanases may be derived from strains of genera including *Aspergillus, Disporotrichum, Penicillium, Neurospora, Fusarium* and *Trichoderma*.

Examples of suitable xylanases include xylanases derived from *H. insolens* (WO 92/17573; *Aspergillus tubigensis* (WO 92/01793); *A. niger* (Shei et al., 1985, Biotech. and Bioeng. Vol. XXVII, pp. 533-538, and Fournier et al., 1985, Bio-tech. Bioeng. Vol. XXVII, pp. 539-546; WO 91/19782 and EP 463 706); *A. aculeatus* (WO 94/21785).

Examples of suitable bacterial xylanases include xylanases derived from a strain of *Bacillus*, such as *Bacillus subtilis*, such as the one disclosed in U.S. Pat. No. 5,306,633 or *Bacillus agaradhaerens*, including *Bacillus agaradhaerens* AC13 disclosed in WO 94/01532, a strain of *Bacillus pumilus*, such as the one disclosed in WO 95/182109, a strain derived from of *Bacillus stearothermophilus*, such as the one disclosed in WO 95/182109.

In a specific embodiment the xylanase is Xylanase I, II or III disclosed in WO 94/21785. Xylanase II from *Aspergillus aculeatus* is preferred.

Contemplated commercially available xylanases include SHEARZYME™, BIOFEED WHEAT™, PULPZYME™ HC (from Novozymes A/S), BioBrite™ EB (from Iogen, Canada) and SPEZYME™ CP (from Genencor Int.).). Xylanase may be added in an amount effective in the range from $0.001 \times 10^6$-$10 \times 10^6$ FXU per dry ton substrate (in whole stillage)

Mannanase

Mannanases are hemicellulases classified as EC 3.2.1.78, and called endo-1,4-beta-mannosidase. Mannanase includes beta-mannanase, endo-1,4-mannanase, and galactomannanase. Mannanase is preferably capable of catalyzing the hydrolysis of 1,4-beta-D-mannosidic linkages in mannans, including glucomannans, galactomannans and galactoglucomannans. Mannans are polysaccharides primarily or entirely composed of D-mannose units. The mannanase may be of any origin such as a bacterium or a fungal organism.

In a specific embodiment the mannanase is derived from a strain of the filamentous fungus genus *Aspergillus*, preferably *Aspergillus niger* or *Aspergillus aculeatus* (WO 94/25576). WO 93/24622 discloses a mannanase isolated from *Trichoderma reseei* useful for bleaching lignocellulosic pulps.

Mannanases have been identified in several *Bacillus* organisms. For example, Talbot et al., Appl. Environ. Microbiol., Vol. 56, No. 11, pp. 3505-3510 (1990) describes a beta-mannanase derived from *Bacillus stearothermophilus*. Mendoza et al., World J. Microbiol. Biotech., Vol. 10, No. 5, pp. 551-555 (1994) describes a beta-mannanase derived from *Bacillus subtilis*. JP-A-03047076 discloses a beta-mannanase derived from *Bacillus* sp. JP-A-63056289 describes the production of an alkaline, thermostable beta-mannanase. JP-A-63036775 relates to the *Bacillus* microorganism FERM P-8856 which produces beta-mannanase and beta-mannosidase. JP-A-08051975 discloses alkaline beta-mannanases from alkalophilic *Bacillus* sp. AM-001. A purified mannanase from *Bacillus amyloliquefaciens* is disclosed in WO 97/11164. WO 91/18974 describes a hemicellulase such as a glucanase, xylanase or mannanase active.

Examples of commercially available mannanases include GAMANASE™ available from Novozymes A/S Denmark.

Mannanase may be added in an amount effective in the range from $0.01 \times 10^9$-$10 \times 10^9$ VHCU per dry ton substrate (in whole stillage).

Pectinase

The pectinase may be any pectinase, in particular of microbial origin, in particular of bacterial origin, such as a pectinase derived from a species within the genera *Bacillus, Clostridium, Pseudomonas, Xanthomonas* and *Erwinia*, or of fungal origin, such as a pectinase derived from a species within the genera *Aspergillus*, in particular from a strain within the species *A. niger* and *A. aculeatus*. Contemplated commercially available pectinases include BIOPREP™, NOVOZYM™ 863, PEXTINEX™ 3XL, PECTINEX™ SMASH, and PECTINEX™ SMACH XXL, BIOCIP™ MEMBRANE (all available from Novozymes A/S, Denmark).

Pectinase may be added in an amount effective in the range from $0.01 \times 10^6$-$10 \times 10^6$ PECTU per dry ton substrate (in whole stillage)

Proteases

According to a process of the invention an effective amount of protease may be present in step i). Proteases are well known in the art and refer to enzymes that catalyze the cleavage of peptide bonds. Suitable proteases include fungal and bacterial proteases. Preferred proteases are acidic proteases, i.e., proteases characterized by the ability to hydrolyze proteins under acidic conditions below pH 7.

Suitable acid fungal proteases include fungal proteases derived from *Aspergillus, Mucor, Rhizopus, Candida, Coriolus, Endothia, Enthomophtra, Irpex, Penicillium, Sclerotium* and *Torulopsis*. Especially contemplated are proteases derived from *Aspergillus niger* (see, e.g., Koaze et al., (1964), Agr. Biol. Chem. Japan, 28, 216), *Aspergillus saitoi* (see, e.g., Yoshida, (1954) J. Agr. Chem. Soc. Japan, 28, 66), *Aspergillus awamori* (Hayashida et al., (1977) Agric. Biol. Chem., 42(5), 927-933, *Aspergillus* aculeatus (WO 95/02044), or *Aspergillus oryzae*, such as protease pepA; and acidic proteases from *Mucor pusillus* or *Mucor miehei*.

Commercial proteases include GC 106™ and SPEZYME™ FAN (available from Genencor, USA). Suitable bacterial proteases, although not acidic proteases, include the commercially available products ALCALASE™ and NEUTRASE™ (available from Novozymes A/S).

Preferably, the protease is an aspartic acid protease, as described, for example, Handbook of Proteolytic Enzymes, Edited by A. J. Barrett, N. D. Rawlings and J. F. Woessner, Academic Press, San Diego, 1998, Chapter 270). Suitable examples of aspartic acid protease include, e.g., those disclosed in R. M. Berka et al. Gene, 96, 313 (1990)); (R. M. Berka et al. Gene, 125, 195-198 (1993)); and Gomi et al. Biosci. Biotech. Biochem. 57, 1095-1100 (1993), which are hereby incorporated by reference.

Protease may be added in an amount effective in the range from $0.0001 \times 10^6$-$1 \times 10^6$ AU per dry ton substrate (in whole stillage).

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. In the case of conflict, the present disclosure including definitions will control. Various references are cited herein, the disclosures of which are incorporated by reference in their entireties. The present invention is further described by the following examples which should not be construed as limiting the scope of the invention.

Material & Methods

Enzymes:

Cellulase DM is a liquid multi-component cellulase preparation derived with cellulases derived from *Trichoderma reesei* and *Thielavia terrestris* and is available from Novozymes A/S, Denmark.

Cellulase CZ is a mono-component *Humicola insolens* endoglucanase EGV and is available from Novozymes A/S, Denmark.

Cellulase C is a liquid multi-component cellulase preparation derived from *Trichoderma reesei* and is available from Novozymes A/S, Denmark.

Xylanase HC is a xylanase derived from *Bacillus* agaradhaerens disclosed in WO 94/01532 and is available from Novozymes A/S, Denmark.

Xylanase SZ is xylanase derived from *Aspergillus aculeatus* disclosed as XYL II in WO 94/21785 and is available from Novozymes A/S, Denmark.

Hemicellulase VL: is a multi-enzyme complex containing a wide range of carbohydrases, including arabinanase, cellulase, hemicellulase, beta-glucanase and xylanase. The enzyme preparation is produced from a selected strain of *Aspergillus aculeatus* and is available from Novozymes A/S, Denmark.

Mannanase GN is a mannanase derived from *Aspergillus niger* and is available from Novozymes A/S, Denmark.

Pectinase BC is a multi-active enzyme preparation of polygalacturonase, glucoamylase and pectinmethylesterase and is available from Novozymes A/S, Denmark.

Beta-glucanase CF is a beta-glucanase derived from *Bacillus amyloliquefaciens* and is available from Novozymes A/S, Denmark.

Beta-glucanase BG is a beta-glucanase derived from *Thermoascus aurantiacus* and available from Novozymes A/S.

Glucoamylase SF is a glucoamylase derived from a strain of *Talaromyces emersonii* and is disclosed in WO9928448 and is available from Novozymes A/S.

Glucoamylase TC is a glucoamylase derived from *Trametes cingulata* disclosed in SEQ ID NO: 2 of WO 2006/069289 and available from Novozymes A/S.

Alpha-amylase JA is an alpha-amylase derived from *Rhizomucor pusillus* and disclosed disclosed as V039 in Table 5 in WO 2006/069290.

Determination of Alpha-Amylase Activity (KNU)

1. Phadebas Assay

Alpha-amylase activity is determined by a method employing Phadebas® tablets as substrate. Phadebas tablets (Phadebas® Amylase Test, supplied by Pharmacia Diagnostic) contain a cross-linked insoluble blue-colored starch polymer, which has been mixed with bovine serum albumin and a buffer substance and tabletted.

For every single measurement one tablet is suspended in a tube containing 5 ml 50 mM Britton-Robinson buffer (50 mM acetic acid, 50 mM phosphoric acid, 50 mM boric acid, 0.1 mM $CaCl_2$, pH adjusted to the value of interest with NaOH). The test is performed in a water bath at the temperature of interest. The alpha-amylase to be tested is diluted in x ml of 50 mM Britton-Robinson buffer. 1 ml of this alpha-amylase solution is added to the 5 ml 50 mM Britton-Robinson buffer. The starch is hydrolyzed by the alpha-amylase giving soluble blue fragments. The absorbance of the resulting blue solution, measured spectrophotometrically at 620 nm, is a function of the alpha-amylase activity.

It is important that the measured 620 nm absorbance after 10 or 15 minutes of incubation (testing time) is in the range of 0.2 to 2.0 absorbance units. In this absorbance range there is linearity between activity and absorbance (Lambert-Beer law). The dilution of the enzyme must therefore be adjusted to fit this criterion. Under a specified set of conditions (temperature, pH, reaction time, buffer conditions) 1 mg of a given alpha-amylase will hydrolyze a certain amount of substrate and a blue colour will be produced. The measured absorbance is directly proportional to the specific activity (activity/mg of pure alpha-amylase protein) of the alpha-amylase in question under the given set of conditions.

2. Alternative Method

Alpha-amylase activity is alternatively determined by a method employing the PNP-G7 substrate. PNP-G7 which is a abbreviation for p-nitrophenyl-alpha,D-maltoheptaoside is a blocked oligosaccharide which can be cleaved by an endo-amylase. Following the cleavage, the alpha-glucosidase included in the kit digest the substrate to liberate a free PNP molecule which has a yellow colour and thus can be measured by visible spectophometry at wavelength Lambda=405 nm (400-420 nm). Kits containing PNP-G7 substrate and alpha-glucosidase is manufactured by Bohringer-Mannheim (cat. No. 1054635).

To prepare the substrate one bottle of substrate (BM 1442309) is added to 5 ml buffer (BM1442309). To prepare the alpha-glucosidase one bottle of alpha-glucosidase (BM 1462309) is added to 45 ml buffer (BM1442309). The working solution is made by mixing 5 ml alpha-glucosidase solution with 0.5 ml substrate.

The assay is performed by transforming 20 microL enzyme solution to a 96 well microtitre plate and incubating at 25° C. 200 microL working solution, 25° C. is added. The solution is mixed and pre-incubated 1 minute and absorption is measured every 15 seconds over 3 minutes at OD 405 nm.

The slope of the time dependent absorption-curve is directly proportional to the specific activity (activity per mg enzyme) of the alpha-amylase in question under the given set of conditions. A detailed description of Novozymes' method for determining KNU and FAU is available on request as standard method EB-SM-0009.02/01.

Determination of Acid Amylolytic Activity (FAU)

One Fungal Alpha-Amylase Unit (1 FAU) is defined as the amount of enzyme, which breaks down 5.26 g starch (Merck Amylum solubile Erg. B.6, Batch 9947275) per hour at Novozymes' standard method for determination of alpha-amylase based upon the following standard conditions:

| Substrate | Soluble starch |
|---|---|
| Temperature | 37° C. |
| pH | 4.7 |
| Reaction time | 7-20 minutes |

A detailed description of Novozymes' method for determining KNU and FAU is available on request as standard method EB-SM-0009.02/01.

Determination of Acid Alpha-Amylase Activity (AFAU)

Acid alpha-amylase activity is measured in AFAU (Acid Fungal Alpha-amylase Units), which are determined relative to an enzyme standard.

The standard used is AMG 300 L (wild type *A. niger* G1 AMG sold by Novozymes A/S). The neutral alpha-amylase in this AMG falls after storage at room temperature for 3 weeks from approx. 1 FAU/mL to below 0.05 FAU/mL.

The acid alpha-amylase activity in this AMG standard is determined in accordance with AF 9⅓ (Novo method for the determination of fungal alpha-amylase). In this method, 1 AFAU is defined as the amount of enzyme, which degrades 5.260 mg starch dry matter per hour under standard conditions.

Iodine forms a blue complex with starch but not with its degradation products. The intensity of colour is therefore directly proportional to the concentration of starch. Amylase activity is determined using reverse colorimetry as a reduction in the concentration of starch under specified analytic conditions.

$$\text{Starch} + \text{Iodine} \xrightarrow[40°\text{C., pH 2.5}]{\text{Alpha-amylase}} \text{Dextrins} + \text{Oligosaccharides}$$

Blue/violet     t = 23 sec. Decolouration

Standard conditions/reaction conditions: (per minute)

| Substrate: | starch, approx. 0.17 g/L |
|---|---|
| Buffer: | Citrate, approx. 0.03 M |
| Iodine ($I_2$): | 0.03 g/L |
| $CaCl_2$: | 1.85 mM |
| pH: | 2.50 ± 0.05 |
| Incubation temperature: | 40° C. |
| Reaction time: | 23 seconds |
| Wavelength: | Lambda = 590 nm |
| Enzyme concentration: | 0.025 AFAU/mL |
| Enzyme working range: | 0.01-0.04 AFAU/mL |

Further details can be found in standard method document EB-SM-0259.02/01 available on request from Novozymes A/S, which folder is hereby incorporated by reference.

Glucoamylase and Alpha-Glucosidase Activity (AGU)

The Novo Glucoamylase Unit (AGU) is defined as the amount of enzyme, which hydrolyzes 1 micromole maltose per minute under the standard conditions 37° C., pH 4.3, substrate: maltose 23.2 mM, buffer: acetate 0.1 M, reaction time 5 minutes.

An autoanalyzer system may be used. Mutarotase is added to the glucose dehydrogenase reagent so that any alpha-D-glucose present is turned into beta-D-glucose. Glucose dehydrogenase reacts specifically with beta-D-glucose in the reaction mentioned above, forming NADH which is determined using a photometer at 340 nm as a measure of the original glucose concentration.

| AMG incubation: | |
|---|---|
| Substrate: | maltose 23.2 mM |
| Buffer: | acetate 0.1 M |
| pH: | 4.30 ± 0.05 |
| Incubation temperature: | 37° C. ± 1 |
| Reaction time: | 5 minutes |
| Enzyme working range: | 0.5-4.0 AGU/mL |
| Color reaction: | |
| GlucDH: | 430 U/L |
| Mutarotase: | 9 U/L |
| NAD: | 0.21 mM |
| Buffer: | phosphate 0.12 M; 0.15 M NaCl |
| pH: | 7.60 ± 0.05 |
| Incubation temperature: | 37° C. ± 1 |
| Reaction time: | 5 minutes |
| Wavelength: | 340 nm |

A folder (EB-SM-0131.02/01) describing this analytical method in more detail is available on request from Novozymes A/S, Denmark, which folder is hereby included by reference.

Determination of Xylanase Activity (FXU)

The endoxylanase activity is determined by an assay, in which the xylanase sample is incubated with a remazol-xylan substrate (4-O-methyl-D-glucurono-D-xylan dyed with Remazol Brilliant Blue R, Fluka), pH 6.0. The incubation is performed at 50° C. for 30 min. The background of non-degraded dyed substrate is precipitated by ethanol. The remaining blue colour in the supernatant is determined spectrophotometrically at 585 nm and is proportional to the endoxylanase activity.

The endoxylanase activity of the sample is determined relatively to an enzyme standard.

The assay is further described in the analytical method EB-SM-397.02 available upon request from Novozymes A/S, Denmark.

Determination of Endo-Glucanase Units (ECU)

The ECU (endocellulose unit) is determined relatively to an enzyme standard. Endocellulase decomposes carboxyl methylcellulose, CMC. The prepared substrate solution contains 35 g/l CMC (Blanose Aqualon) in 0.1 M phosphate buffer at pH 7.5. The enzyme sample to be analysed is determined is dissolved in the same buffer.

0.15 ml standard enzyme solution or the unknown enzyme sample is placed in 10 ml test tubes. 5 ml CMC-substrate solution, preheated to 40° C., is added. The joint solution is mixed thoroughly, incubated for 30 minutes and placed in the viscometer.

The method is further described in details in AF302/1-GB available from Novozymes A/S upon request.

Determination of Endo-Glucanase Activity (EGU)

A substrate solution containing 34.0 g/l CMC (Blanose Aqualon) in 0.1 M phosphate buffer, pH 6.0 is prepared. The enzyme sample to be analysed is dissolved in the same buffer. 14 ml substrate solution and 0.5 ml enzyme solution are mixed and transferred to a vibration viscosimeter (e.g. MIVI 3000 available from Sofraser, France) thermostated at 40° C. Endoglucanase unit (EGU) is determined as the ratio between the viscosity of the sample and the viscosity of a standard enzyme solution.

The assay is further described in standard method document EB-SM-0275.02/01 available upon request from Novozymes A/S, Denmark.

Determination of Pectintranseliminase Unit (PECTU)

The method is based on the enzyme's degradation of a pectin solution by a transeliminase reaction, the double bonds formed result in an increase in the absorption at 238 nm which is followed by a spectrophotometer.

| Reaction conditions | |
|---|---|
| Temperature: | 30° C. ± 0.5° C. |
| pH: | 3.50 ± 0.02 |
| Substrate: | 0.24% Pectin (Obipektin, Brown Ribbon Pure, Art. no. 1.1B00.A. Lot no. 0304) |
| Enzyme concentration: | 1.9-2.3 PECTU/mL |
| Reaction time: | 6 minutes |
| Measuring time: | 5 minutes |
| Wavelength: | 238 nm |

The activity is determined relative to a PECTU standard. The result is given in the same units as for the standard, which is designated: PECTU—Pectintranseliminase Unit.

The assay is further described in standard method document EB-SM-0573.02 available upon request from Novozymes A/S, Denmark.

Determination of Fungal Beta-Glucanase Activity (FBG)

Fungal beta-glucanase reacts with beta-glucan to form glucose or reducing carbohydrate which is determined as reducing sugar using the Somogyi Nelson method.

1 fungal beta-glucanase unit (FBG) is the amount of enzyme which, under the standard conditions outlined above, releases glucose or reducing carbohydrate with a reduction capacity equivalent to 1 micro mol glucose per minute.

| Reaction conditions | |
|---|---|
| Substrate concentration | 0.5% beta glucan |
| Temperature | 30° C. |
| pH | 5.0 |
| Reaction time | 30 minutes |
| Detection: Wavelength | 520 nm |

The assay is further described in standard method document EB-SM-0338.02/01 available upon request from Novozymes A/S, Denmark.

Determination of Hemicellulase (VHCU)

The hemicellulase unit (VHCU) is an expression of the enzyme's ability to hydrolyze beta-1,4 bonds between the mannose molecules in a dissolved galactomannan and thereby reduce the viscosity of the solution. The unit is determined relative to a Novozymes A/S enzyme standard.

| Reaction conditions: | |
|---|---|
| Temperature: | 30.0° C. |
| pH: | 5.0 |
| Reaction time: | 60 minutes |
| Substrate conc.: | approx. 0.5% (w/v) |
| Enzyme conc.: | 0.03-0.08 VHCU/mL |
| Boiling time: | 15 minutes |

The assay is further described in standard method document EB-SM-0156.02/01 available upon request from Novozymes A/S, Denmark.

Determination of Beta-Glucanase Activity (BGU)

1 beta-glucanase unit (BGU) is the amount of enzyme which, under the standard conditions outlined above, releases glucose or reducing carbohydrate with a reduction capacity equivalent to 1 micro mol glucose per minute.

| Reaction conditions: | |
|---|---|
| Substrate concentration: | 0.5% beta-glucan |
| Temperature: | 30° C. |
| pH: | 7.5 |
| Reaction time: | 30 minutes |
| Detection: Wavelength: | 520 nm |

The assay is further described in standard method document EB-SM-0275.02/01 available upon request from Novozymes A/S, Denmark.

Determination of Protease Activity (AU)

Dimethyl casein (DMC) is hydrolyzed by the proteolytic enzyme to small peptides. The primary amino groups formed in this process react with trinitrobenzene sul-phonic acid (TNBS) forming a coloured complex. This colour development is monitored in situ so the change in absorption per time unit can be calculated. This FIGURE is a measure of the reaction rate and thus of the enzyme activity.

| Reaction conditions for the DMC reaction | |
|---|---|
| Temperature: | 50° C. |
| pH: | 8.3 |
| Wavelength: | 405 nm |
| Reaction time: | 8 min. |
| Measuring time: | 2 min. |
| Enzyme concentration range: | 0.072-0.216 mAU/ml. |

The activity is determined relative to an enzyme standard.

The assay is further described in standard method document EB-SM-0218.02/02 available upon request from Novozymes A/S, Denmark.

EXAMPLES

Example 1

Dewatering Whole Stillage

Whole stillage (7.7 wt-% dry solids, pH=4.5) from conventional, dry-milled ethanol fermentation was used as substrate.

An aliquot (50 mL) of whole stillage was placed into a centrifuge tube and warmed to 40° C. Cellulase DM ($1.8 \times 10^6$ EGU/dry ton substrate) was added and the mixture was gently agitated on a rotary shaker for 120 minutes.

The tube was centrifuged for 5 minutes at 2000 rpm.

The supernatant was decanted and the resulting wet cake was carefully transferred to a tared crucible and dried in an oven (105° C.) overnight.

The dried cake solids was weighed and compared to the control solids weight (where no enzyme was used). The results, along with several other enzymes tested, are shown in Table 1.

TABLE 1

| Enzyme[1] | % Cake Solids[1] | % Relative Increase from Control[2] | dose/DT (dry ton substrate) |
|---|---|---|---|
| None (control) | 21.30 | — | — |
| Cellulase DM | 22.49 | 5.59 | $1.8 \times 10^6$ EGU |
| Cellulase CZ | 21.72 | 1.97 | $4.5 \times 10^6$ ECU |
| Cellulase C | 21.63 | 1.55 | $5.0 \times 10^6$ ECU |
| Xylanase HC | 21.94 | 3.00 | $0.133 \times 10^6$ FXU |
| Xylanase SZ | 22.37 | 5.02 | $1.0 \times 10^6$ FXU |
| Hemicellulase VL | 22.29 | 4.65 | $0.1 \times 10^6$ FBG |
| Mannanase GN | 22.25 | 4.46 | $1.0 \times 10^9$ VHCU |
| Pectinase BC | 22.38 | 5.07 | $2.5 \times 10^6$ PECTU |
| Beta-glucanase CF | 22.12 | 3.85 | $0.2 \times 10^6$ BGU |

[1]mass of dried cake solids divided by mass of wet cake.
[2](cake solids minus control cake solids × 100) divided by control cake solids.

Example 2

Dewatering Whole Stillage Using CST Method

For this study whole stillage from conventional ethanol fermentation of dry-milled corn was used. The dry solid content was determined to 10.58% DS using a Moisture Analyzer IR-200 (Denver Instrument). The pH of the whole stillage was measured 4.05. The pH was not adjusted during this study. A 50 mL whole stillage was pipetted into each test tube. 100 microL of the enzymes listed in the table below were added into tubes. All tubes were placed in 45° C. shaking water bath after mixing with Vortex-2 Genie (Scientific Industries). After 20 hours gentle shaking, tubes were taken out and cooled to room temperature. The dewatering effect of the enzymes was evaluated using Capillary Suction Timer (CST) (Triton Electronics, Ltd). The time of water travel on the filter paper was recorded. The shorter the time is, the better the dewatering effect is. Cellulases and/or hemicellulases including xylanase, glucanase, and mananase have dewatering effect on whole stillage. Enzymes with low activity at pH4 have shown little or no effect. All experiments were duplicate. Results are in table below.

| Name | pH | Temp (° C.) | Time (hours) | Average CST (s) |
|---|---|---|---|---|
| no enzyme control | 4.05 | 45 | 20 | 89.8 |
| Hemicellulase VL | 4.05 | 45 | 20 | 71.0 |
| beta-glucanase BG | 4.05 | 45 | 20 | 80.6 |
| Xylanase SZ | 4.05 | 45 | 20 | 80.1 |

Example 3

Dewatering Whole Stillage Using CST Method

Whole stillage was the same as in example without modification in this study. A 50 ml whole stillage was pipetted in each test tube. A specific amount of enzyme was added into the tubes. All tubes were placed in 50° C. shaking incubator after mixing with Vortex-2 Genie (Scientific Industries). After 45 minutes shaking, tubes were taken out and cooled to room temperature. The dewatering effect of enzyme was evaluated using Capillary Suction Timer (CST) (Triton Electronics, Ltd). The results are shown in Table below.

| Enzyme | mg enzyme protein/g DS | CST (sec) | % |
|---|---|---|---|
| Control | 0 | 116.5 | 100% |
| Glucoamylase SF | 0.025 | 109.0 | 94% |
| Glucoamylase SF | 0.25 | 111.7 | 96% |
| Glucoamylase TC | 0.025 | 100.8 | 86% |
| Glucoamylase TC | 0.25 | 99.0 | 85% |
| Amylase JA | 0.05 | 104.6 | 90% |

The invention claimed is:

1. A method of dewatering whole stillage derived from a process of producing a fermentation product, comprising the steps of
    (a) subjecting whole stillage to one or more enzymes capable of degrading one or more whole stillage components,
    (b) separating the material into a solid fraction and a liquid fraction.

2. The method of claim 1, wherein steps (a) and (b) and carried out simultaneously or sequentially.

3. The method of claim 1, further comprising
(c) drying the solid fraction.

4. The method of claim 1, wherein the separation in step (b) is carried out by centrifugation.

5. The method of claim 1, wherein the separation in step (b) is carried out by filtration.

6. The method of claim 5, wherein the filtration is performed using a filter press, a screw press, a plate-and-frame press, a gravity thickener or decker.

7. The method of claim 1, wherein step (a) is carried out at a temperature of 20-60° C.

8. The method of claim 1, wherein step (a) is carried out at a pH of 3-7.

9. The method of claim 1, wherein the whole stillage is derived from a process of producing a fermentation product utilizing starch-containing material as feedstock.

10. The method of claim 9, wherein the feedstock is a cereal.

11. The method of claim 9, wherein the feedstock is selected from the group consisting of corn, wheat, barley, cassava, sorghum, rye, potato, or any combination thereof.

12. The method of claim 1, wherein the fermentation product is an alcohol.

13. The method of claim 1, wherein the fermentation product is ethanol.

14. The method of claim 1, wherein one or more enzymes used in step (a) is a carbohydrase.

15. The method of claim 1, wherein the enzyme used in step (a) is selected from the group consisting of amylase, glucoamylase, cellulase, beta-glucanase, hemicellulase, pectinase, mannanase, and protease, or a mixture thereof.

16. The method of claim 1, wherein the enzyme used in step (a) is an alpha-amylase or xylanase.

* * * * *